United States Patent Office 3,447,954
Patented June 3, 1969

3,447,954
PROCESS FOR PRODUCING DELAYED-TACK ADHESIVE COMPOSITIONS AND COATING SHEET MATERIALS THEREWITH
Hardy Gotthard Lohse, Dallas, Tex., assignor to St. Regis Paper Company, New York, N.Y., a corporation of New York
No Drawing. Continuation-in-part of application Ser. No. 488,280, Sept. 17, 1965. This application Mar. 29, 1967, Ser. No. 628,224
Claims priority, application Canada, Aug. 24, 1966, 968,665
Int. Cl. C09j 3/14
U.S. Cl. 117—122         18 Claims

ABSTRACT OF THE DISCLOSURE

Processes are described for producing compositions that can be applied to sheet materials to produce a dry, nontacky film that becomes tacky when molten and remains tacky for a long period after cooling, which comprises mixing together an aqueous dispersion of a thermoplastic polymer with a substantially larger amount of a molten normally solid plasticizer that is compatible with the thermoplastic polymer to form an emulsion of the water-in-oil type, and processes of applying the said emulsion while still warm to the sheet material that is to be coated and permitting the thus-coated sheet material to dry in the ambient atmosphere.

---

This application is a continuation-in-part of my prior copending application No. 488,280, filed Sept. 17, 1965, now abandoned.

This invention relates to adhesive compositions which can be applied as films to labels, tapes, cartons, boxes, and the like, and to methods of preparing such adhesive compositions, and sheet materials coated and sealed by means of such adhesive compositions. Dried films of the adhesive compositions of this invention are nontacky at normal temperatures but, upon the application of heat, become tacky and remain tacky for long periods after they have cooled to room temperature. These adhesive compositions are particularly adapted for use in coating labels or other sheet materials that are to be used in making or sealing packages in which the label or sheet material that is coated with a dry film of the adhesive composition is subjected to heat so as to activate or tackify the film of the adhesive composition. Packages sealed by means of such labels or coated sheet materials may subsequently be opened by removing such labels or by opening the package at a seam that was joined with such a film of the adhesive composition and be repeatedly resealed with the same label or coated sheet material without the application of heat.

A number of adhesive compositions that have so-called "delayed tack" characteristics, that is, remain tacky for long periods after being applied, are known. However, these compositions are deficient in one or more respects. For example, many of the prior adhesive compositions of this type have a very limited delayed tack period which ranges only from a few seconds to a few minutes.

Some adhesive compositions of this type are made by admixing a mechanically pulverized solid plasticizer with a thermoplastic material, or by dusting such a solid plasticizer onto a tacky film of an adhesive composition to induce crystallization of the adhesive composition.

Other adhesive compositions having such delayed-tack characteristics have been heretofore described in United States Patents Nos. 2,613,156 and 2,613,191. One type of these compositions that is described in the second of these patents as consisting essentially of a base of a thermoplastic polymer throughout which is distributed particles of a solid plasticizer that had been coated with a layer of polyvinyl alcohol or other emulsifying agent. Such delayed-tack adhesive compositions were made by melting and emulsifying the solid plasticizers in an aqueous solution of polyvinyl alcohol, without or together with the addition of other emulsifying agents, and thereafter mixing this emulsion with an aqueous dispersion of the thermoplastic resin, consisting of an oil-in-water emulsion in which two kinds of particles were dispersed, was then applied as a film to a paper label or a flap of a carton and the label or carton flap was dried. If dried in air at 72° F. (22° C.), for example, periods of two days or longer were required. Furthermore, the paper label or carton to which the aqueous adhesive composition was applied actually became moist, soft, and pulpy and the resulting dried label or carton was consequently wrinkled or otherwise deformed.

Another type of these adhesive compositions which is similar to the foregoing and is described in the first of these patents as being essentially an oil-in-water emulsion comprising particles which consist of a core of a thermoplastic polymer that is partially plasticized with a solid plasticizer, an intermediate surrounding layer of the solid plasticizer, and an outer layer of polyvinyl alcohol or other emulsifying agent. Such delayed-tack adhesive compositions were made by coalescing, either by heating and melting, or by dissolving in a common solvent for both, a mixture of a thermoplastic polymer together with a solid plasticizer to form a clear homogeneous liquid. This coalesced liquid was then added to water containing polyvinyl alcohol or other emulsifying agent and was agitated so as to produce an emulsion. Upon cooling the resulting emulsion, a separation of a portion of the solid plasticizer was said to occur in each of the globules. Aqueous adhesive compositions of this type have the same disadvantages or objectional characteristics as the other aqueous adhesive compositions that were referred to hereinbefore. The interval during which films of such adhesive compositions remain tacky after they had been heated and cooled, which was said to be of the order of 70 seconds, is also much less than is required for the uses to which the adhesive compositions of the present invention are adapted.

The principal object of the present invention is to provide adhesive compositions which become tacky after heating and remain tacky after cooling for long periods, and which can be applied as films to cellulosic sheet materials and dried without producing wrinkling or other deformation of the cellulosic sheet materials.

Another object of this invention is to provide such delayed-tack adhesive compositions which are emulsions of the water-in-oil type (rather than the oil-in-water type) that contain only relatively small amounts of water so that films of these emulsions that are applied to cellulosic sheet materials, such as paper, cardboard, and the like, rapidly become dry and nontacky without producing any accompanying wrinkling of the cellulosic sheet material.

Another object of the present invention is to provide a simple and economical method of preparing such delayed-tack adhesive compositions.

It is also an object of this invention to provide labels, tapes, cartons, boxes, and similar articles having surface areas that are covered with essentially dry, nontacky films of an adhesive composition, which films, upon the application of heat, become and remain tacky for long periods after cooling.

Other objects of the invention, some of which are referred to hereinafter, will be apparent to those skilled in the art to which it pertains.

In preparing the adhesive compositions of the present invention, a normally solid plasticizer, such as is used in the known delayed-tack aqueous adhesive compositions that were referred to hereinbefore and which are specifically referred to hereinafter, or a mixture of two or more such normally solid plasticizers, is heated until it is melted. A smaller amount of an aqueous emulsion or dispersion of a thermoplastic polymer, such as are used in making some of the known delayed-tack adhesive compositions that were referred to hereinbefore and are also specifically referred to hereinafter, is then added with vigorous agitation to the molten plasticizers to produce a fluid emulsion in which the solid plasticizer is the continuous phase or matrix and the discontinuous or dispersed phase consists of discrete droplets or particles of the thermoplastic polymer which are present in the aqueous emulsion, each of which is coated with a thin layer or film of water containing an emulsifying agent. In the adhesive compositions of the present invention, the individual droplets or particles of the thermoplastic polymer are surrounded by a relatively thin protective layer of water that may contain an emulsifying agent which prevents them from coming into direct contact with and mixing or reacting with the molten plasticizer.

The adhesive compositions of the present invention may be prepared in accordance with the following general procedure, which consists of two principal steps:

(1) The normally solid plasticizer or a mixture of normally solid plasticizers is heated until it has melted and is homogeneous and is then cooled to a temperature at which it is still fluid.

(2) To an amount of the foregoing cooled fluid plasticizer or mixture of plasticizers that is equivalent to between 3 and 10 parts by weight (preferably about 5 parts by weight) is added with vigorous agitation an amount of the aqueous emulsion of the thermoplastic polymer that is equivalent to one part by weight of the thermoplastic polymer that is contained in the aqueous emulsion. The temperature of the mixture is maintained high enough to facilitate mixing and the formation of small particles but below that at which the plasticizer and thermoplastic polymer coalesce, fuse together, or otherwise interact to any substantial degree. This temperature will generally fall in the range between 80° and 140° F. (27° and 60° C.).

The normally solid plasticizers which may be used in the preparation of the adhesive compositions of the present invention include solid plasticizers which are hydrophobic, are compatible with and soften or plasticize the thermoplastic polymer component of the adhesive composition, and have a melting or softening point of at least about 49° C. and below about 100° C. Solid plasticizers which can be supercooled (that is, cooled to temperatures below their melting points without crystallizing or solidifying) are a preferred class of plasticizers for use in the preparation of the adhesive compositions of the present invention since, because they do not crystallize readily, they have a tendency to increase the period of delayed tackiness of the adhesive composition after it has been activated. The known esters of benzoic, caprylic, citric, phthalic, and phosphoric acids, and sulfonamide derivatives that are referred to generally as plasticizers, whose melting points fall within the foregoing range, are most eminently suitable for use in the preparation of the adhesive compositions of the present invention. These plasticizers include, for example, diphenyl phthalate, dicyclohexyl phthalate, glycerol tribenzoate, ethylene glycol dibenzoate, pentaerythritol tetrabenzoate, trimethylolethane tribenzoate, sucrose benzoate, and N-cyclohexyl-p-toluenesulfonamide, all of which are referred to in the examples hereinafter, as well as dimethyl isophthalate (melting point 66–67° C.), dihexyl and diisohexyl phthalates, dihydroabietyl phthalate (melting point 65° C.), sucrose octaacetate (melting point 89° C.), tricyclohexyl citrate (melting point 57° C.) and similar compounds, as well as mixtures of such plasticizers which have a eutectic melting point of at least about 49° C.

The aqueous emulsions of thermoplastic polymers which may be used in the preparation of the adhesive compositions of the present invention include aqueous aqueous emulsions of such thermoplastic film-forming water-insensitive polymers as the homopolymers of ethylene, vinyl acetate, vinyl chloride, vinylidene chloride, styrene, and methyl and ethyl acrylates and methacrylates, copolymers of ethylene and vinyl acetate, copolymers of styrene and butadiene, and copolymers of vinylpyrrolidone and one or more monomers of the group consisting of vinyl acetate, methyl and ethyl acrylates and methacrylates, and styrnee, and mixtures or blends of these polymers.

Aqueous emulsions of these polymers are generally prepared by polymerizing the monomer or mixture of monomers that are to form the polymer in an aqueous medium containing an emulsifying agent. A wide range of aqueous emulsions of such thermoplastic polymers are commercially available under various trade names, some of which are referred to in the examples hereinafter. The emulsifying agent that is used in the preparation of the aquous emulsions, which remains in the aqueous emulsion and in the adhesive composition prepared from the emulsion, has no substantial effect upon the properties of the adhesive compositions of the present invention and can be omitted if the particles of thermoplastic polymer can be prevented from coalescing without it, such as in the case of the aqueous emulsion or dispersion of the thermoplastic copolymer of vinylpyrrolidone and vinyl acetate that is referred to in Example 10 hereinafter. The emulsifying agent may be any of the numerous known anionic or nonionic emulsifying agents that are used in the preparation of such commercially available aqueous emulsions of thermoplastic polymers that have heretofore been used for the preparation of adhesive compositions.

The viscosity of the adhesive compositions of this invention, which consist essentially of emulsions of the water-in-oil type, can readily be controlled within wide limits by the addition of small quantities of water and maintenance of a suitable temperature that is low enough so as to provide emulsions that may be used to coat sheet materials or substrates in accordance with conventional coating processes, such as brushing, spraying, or application by means of rolls. The film that has been thus applied to the substrate becomes dry because of the solidification or crystallization of the plasticizer that is present in the film. The rate of crystallization or solidification of the plasticizer in the film may be increased by agitating or brushing the surface of the film while it is drying. The dry nontacky film, which consists essentially of the solidified plasticizer through which are dispersed minute particles of the thermoplastic polymer, remains dry and nontacky during normal storage and handling operations, that is, at temperatures between about 0° F. (−18° C.) and about 110° F. (43° C.). After solidification of the film, the water that was originally present in the adhesive composition in the form of thin layers surrounding the particles of the thermoplastic polymer, has no further useful function. Some of the water diffuses into the atmosphere during the drying or subsequent storage of the coated substrate, some may be absorbed by the substrate, and all or the greater part of any remaining water will generally be expelled at the time the film is activated by heating at a temperature which is generally above about 220° F. (105° C.).

When activated, such as by heating to a temperature above about 220° F. (105° C.), the plasticizer and the thermoplastic polymer in the film fuse together to form a tacky adhesive film. This film will remain tacky for an extended period of time, even after it has cooled to room temperature. The fusion temperature, as well as the length of the period of delayed tack, can be varied by the use of different amounts and combinations of plasticizers and thermoplastic materials in the preparation of the adhesive composition.

The following examples illustrate preferred embodiments of the adhesive compositions of the present invention, methods for their preparation, and uses of such compositions:

Example 1

A mixture of solid plasticizers consisting of 58 parts by weight of dicyclohexyl phthalate (melting point 58–65° C.), 7 parts by weight of pentaerythritol tetrabenzoate (melting point 94.8° C.), and 43 parts by weight of glycerol tribenzoate (melting point 71° C.) were heated in a glass beaker to a temperature of 275° F. (135° C.), at which temperature the mixture was homogeneous and fluid. The molten mixture was then cooled to a temperature of 120° F. (49° C.). Fifty (50) parts by weight of an aqueous emulsion containing 40 percent by weight of a copolymer of vinylpyrrolidone and ethyl acrylate in the ratio of 60 parts by weight of vinylpyrrolidone to 40 parts by weight of ethyl acrylate containing an anionic emulsifying agent, such as is sold under the trade name Polectron 130 by General Aniline and Film Corporation of New York, New York, was heated to a temperature of 120° F. (49° C.) and added slowly and with vigorous agitation to the molten mixture whose temperature was maintained at 120° F. (49° C.). The resulting emulsion comprised a continuous phase that consisted of the molten mixture of plasticizers and a disperse phase consisting of the aqueous emulsion of the thermoplastic polymer in which the particles of the polymer had a relatively uniform size below approximately 5 microns in diameter. After the resulting emulsion had cooled, but while it was still warm and fluid, it was applied as a film by means of a coating machine to a web of paper labels in an amount corresponding to a dry weight of 13 pounds (5.9 kilograms) per ream consisting of 300 square feet (287.7 square meters) of surface. The coated paper label stock was allowed to stand in the ambient air until the film of the adhesive composition had solidified or crystallized and was completely dry and nontacky.

The relative adhesion produced by the adhesive composition of this example was determined in accordance with a method and with an instrument similar to that described by Anthony Kinsel and Hans Schindler in an article entitled "Adhesion Test for Micro-crystalline Wax" that was published in Paper Trade Journal, vol. 128, No. 5, pp. 18 to 20 (Feb. 3, 1949). The instrument is referred to as a Suter tester or single strand strength and elongation tester and is available from Alfred Suter Co., 200 Fifth Avenue, New York, New York 10010. In this test, the relative adhesive is measured by determining the force in grams per linear inch (2.54 centimeters) that is required to separate or peel a specimen of the coated label stock from a sheet of polyethylene to which it has been joined in the following manner: A strip of the coated label stock is placed on a sheet of polyethylene so that the dry film of the adhesive composition on the coated label stock is in contact with the polyethylene. The film of the adhesive composition is then activated by pressing the two sheets together and placing them under a heated metal bar for a period of 3 seconds. The metal bar is of such dimensions and weight that the joined sheets are subjected to a pressure of 7.5 grams per square inch (1.16 grams per square centimeter) while its temperature during the period of activation of the adhesive composition is maintained at 230° F. (110° C.). The edge of the polyethylene sheet portion of the thus joined or adhered specimen is then clamped between the jaws of the lower clamp of the Suter tester and the edge of the label portion of the specimen is clamped between the jaws of the upper clamp. The Suter tester provides for a constant rate of pull on the test specimen as it is held between the clamps by means of a hydraulic brake consisting of a piston moving inside a cylinder filled with oil. The constant rate of pull that was used in the tests that are disclosed herein was 12 inches (30.5 centimeters) per minute, and this pulling force was applied between the two clamps in such manner that the coated label specimen was pulled or peeled from the polyethylene sheet at an angle of 180°, namely, in a direction parallel to the polyethylene sheet portion of the specimen.

Specimens of the label stock that had been thus joined or adhered to the polyethylene sheet were aged at various temperatures for various periods and the relative adhesion of the two sheets of each of the test specimens to each other was also determined. In Table 1 which follows the relative adhesion is specified in values representing grams per linear inch (which values are equivalent to grams per 2.54 centimeters or which, when multiplied by the factor 0.394, represent grams per centimeter), in accordance with the specified temperatures and period at which each of the specimens was aged.

A relative adhesion value between 150 and 400 grams per inch in this test indicates satisfactory performance of the adhesive compositions. At lower values the sheets are not bonded to each other firmly enough and, at values of 500 grams and higher, the paper label stock is not readily peelable from the polyethylene sheet without tearing.

No recrystallization or resolidification of the adhesive film was observed in connection with any of the specimens that are referred to in Table 1 nor was any tendency observed of the adhesive film to transfer from the paper to the polyethylene sheet.

TABLE 1.—RELATIVE ADHESION (GRAMS PER INCH)

| Aging period | Aging temperature | | |
|---|---|---|---|
| | 0° F. (−18°C.) | 70° F. (21° C.) | 110° F. (43° C.) |
| 10 minutes | 180 | 185 | 225 |
| 1 hour | 185 | 240 | 275 |
| 4 days | 235 | 280 | 290 |
| 7 days | 230 | 285 | 315 |

In another test, the paper label portion of specimens of the coated paper label stock that were joined or adhered to pieces of polyethylene sheets by heat and pressure as described hereinbefore, were peeled away from the polyethylene portion of the specimen and then pressed to a fresh polyethylene sheet to which they adhered because of the tackiness of the film of the adhesive composition. The labels that had been thus pressed and joined to the fresh polyethylene sheets were then aged for one day at various temperaturse and the relative adhesion between the two sheets was determined in the same manner with the Suter tester as described hereinbefore. The results are included in Table 2.

Table 2.—Relative adhesion (grams per inch) after application to fresh polyethylene sheet Aging period of 1 day at aging temperature:
 0° F. (−18° C.) _____ 160
 70° F. (21° C.) _____ 190
 110° F. (43° C.) _____ 200

The foregoing results indicate that the adhesive composition described in this example provides a dry nontacky film that, upon initial activation by heat, performs satisfactorily and that, after the sheet to which it has been applied is peeled or separated from the polyethylene sheet, can be reapplied and joined to the same or another polyethylene sheet and will adhere thereto without reheating because of the tackiness remaining in the film. It has been further found that paper label stock coated with this adhesive composition and joined by heat to a polyethylene sheet will retain its pressure-sensitive or delayed tack characteristics for periods of at least seven days.

Paper labels that had been coated with the adhesive composition of this example as described hereinbefore have been found to be eminently satisfactory for use as end labels for loaves of bread that had been wrapped in polyethylene sheet materials. The package containing the bread can be opened by peeling one of the end labels to remove a portion of its contents as desired, and can be repeatedly sealed with the same end label.

The original adhesive composition of this example, before it was applied as a film to the paper label stock, had a viscosity of 1250 centipoises at a temperature of 75° F. (24° C.). When 5 grams of water was added to 158 grams of the composition, its viscosity decreased to 680 centipoises at that temperature.

Although the foregoing description and tests pertained only to adhesion of the label stock to polyethylene sheets, similar results have been observed when the coated label stock is joined by heat to paper, metal, glass, and other smooth surfaces, from which it can be peeled after long periods and rejoined at room temperature merely by applying it with pressure to the same or other surfaces.

Example 2

A mixture of solid plasticizers consisting of 65 parts of dicyclohexyl phthalate and 35 parts of glycerol tribenzoate was heated in a beaker until a clear homogeneous melt was obtained. This molten mixture of plasticizers was then cooled to 80° F. (26.5° C.). Fifty (50) parts by weight of an aqueous emulsion containing 50 percent by weight of a copolymer formed from equal parts by weight of ethylene and vinyl acetate containing a nonionic emulsifying agent, such as is available under the trade name Aircoflex 100 from the Air Reduction Chemical and Carbide Company Division of Air Reduction Company, Inc., of New York, N.Y., that was heated to a temperature of 26.5° C., was then added slowly with vigorous agitation to the molten mixture of plasticizers to produce an emulsion in which the thermoplastic copolymer is the dispersed phase.

Sheets of paper label stock were coated with the resulting adhesive composition and subjected to the tests described hereinbefore in connection with Example 1. The results were essentially identical with those obtained with the adhesive composition disclosed in Example 1. The average relative adhesion after aging for 4 days was about 200 grams per inch and traces of recrystallization of the plasticizer were noted only in the sample that had been aged for 4 days at a temperature of 110° F. (43° C.).

Example 3

An adhesive composition was prepared in accordance with the general procedure described in Examples 1 and 2 from a mixture of plasticizers consisting of 50 parts by weight of glycerol tribenzoate and 50 parts by weight of trimethylolethane tribenzoate (melting point 73° C.) and 60 parts by weight of an aqueous emulsion containing 45 percent by weight of a thermoplastic acrylate ester polymer containing a nonionic emulsifying agent and having a pH between 2.5 and 3.5, such as is available under the trade name Rhoplex K-3 from Rohm and Haas Company of Philadelphia, Pa. The molten mixture of plasticizers and the aqueous emulsion of the thermoplastic polymer were mixed and vigorously agitated at a temperature of 140° F. (60° C.) and the resulting adhesive composition was coated onto paper label stock, specimens of which were then subjected to the tests described hereinbefore in connection with Example 1.

Specimens of the labels, when activated by heat, exhibited good initial relative adhesion and were peelable from the polyethylene sheet. They failed to retain as much tackiness upon aging at 110° F. (43° C.) as did the labels of Examples 1 and 2, however, but were nonetheless satisfactory in this respect. It was also observed that traces of the adhesive composition were transferred to the polyethylene sheet upon aging. The results of the determination of relative adhesion to the original polyethylene sheet and after attachment to a fresh polyethylene sheet are included in Tables 3 and 4 hereinafter.

TABLE 3.—RELATIVE ADHESION (GRAMS PER INCH)

| Aging period | Aging temperature | | |
|---|---|---|---|
| | 0° F. (−18° C.) | 70° F. (21° C.) | 110° F. (43° C.) |
| 10 minutes | 170 | 190 | 205 |
| 1 hour | 180 | 210 | 220 |
| 4 days | 195 | 215 | 225 |
| 7 days | 205 | 240 | 260 |

Table 4.—Relative adhesion (grams per inch) after application to fresh polyethylene sheet
Aging period of 1 day at aging temperature:
0° F. (−18° C.) _____ 150
70° F. (21° C.) _____ 170
110° F. (43° C.) _____ 200

Example 4

An adhesive composition was prepared in accordance with the general procedure described in Examples 1 and 2 from 100 parts of the same mixture of plasticizers that was used in Example 3 and 40 parts by weight of an aqueous emulsion containing 40 percent by weight of a thermoplastic copolymer of vinylpyrrolidone and styrene in the ratio of 60 parts by weight of vinylpyrrolidone to 40 parts by weight of styrene containing an anionic emulsifying agent, such as is available, for example, under the trade name Polectron 430, from General Aniline and Film Corporation that was referred to in Example 1. The molten mixture of plasticizers and the aqueous emulsion of the thermoplastic copolymer were vigorously agitated at a temperature of about 125° F. (52° C.) and the resulting adhesive composition was coated onto paper label stock, specimens of which were then subjected to the tests described hereinbefore in connection with Example 1.

Specimens of the labels, when activated by heat, exhibited good initial relative adhesion and were highly tacky. No recrystallization of the adhesive film was apparent after aging of the specimen for 4 days at the three temperatures specified. Specimens of the labels that had been aged for more than 4 days, however, were no longer peelable from the polyethylene sheet without damage to the label or to the substrate sheet, hence the adhesive composition of this example is characterized by a shorter period of delayed tack than any of the adhesive compositions of the preceding example.

Example 5

An adhesive composition was prepared in accordance with the general procedure described in Examples 1 and 2 from a mixture of plasticizers consisting of 50 parts by weight of dicyclohexyl phthalate, 25 parts by weight of glycerol tribenzoate, and 15 parts by weight of trimethylolethane tribenzoate and 40 parts by weight of the aqueous emulsion of the copolymer of vinylpyrrolidine and ethyl acrylate that was used in Example 1. The molten mixture of plasticizers and the aqueous emulsion of the thermoplastic polymer were mixed and vigorously agitated at a temperature of 100° F. (38° C.).

Labels coated with the resulting adhesive composition differed from those described in Example 1 only in having slightly less initial adhesion and leaving traces of the adhesive composition adhering to the polyethylene sheet when the label was peeled therefrom.

Example 6

An adhesive composition was prepared exactly as described in Example 2 except that an equal percent by weight of N-cyclohexyl-p-toluenesulfonamide (melting point 86° C.) was substituted for the glycerol tribenzoate used in Example 2 and the mixing was effected at a temperature of 100° F. (38° C.) instead of 26.5° C.

Specimens of labels coated with the resulting adhesive composition differed from those described in Example 1 only in having a period of delayed tack between 3 to 5 instead of at least 7 days.

Example 7

An adhesive composition that was prepared in accordance with the general method described in Examples 1 and 2 from a mixture of plasticizers consisting of 70 parts by weight of glycerol tribenzoate and 30 parts by weight of ethylene glycol dibenzoate (melting point 70° C.) and 60 parts by weight of the aqueous emulsion of the copolymer of vinylpyrrolidone and ethyl acrylate that was used in Example 1. The plasticizer and emulsion of the thermoplastic polymer were mixed and agitated vigorously at a temperature of 120° F. (49° C.).

Specimens of labels coated with the resulting adhesive compositions differed from those described hereinbefore only in having a period of delayed tack of about 3 days.

Example 8

An adhesive composition was prepared exactly as described in Example 3 except that, instead of the aqueous emulsion of the thermoplastic polymer used therein, an aqueous emulsion was used that contained 45 percent by weight of a copolymer of styrene and butadiene in the ratio of 80 parts by weight of styrene to 20 parts by weight of butadiene and a nonionic emulsifying agent, which is available under the trade designation Dow 859 from Dow Chemical Company of Midland, Mich., and the mixing was effected at a temperature of 120° F. (49° C.) instead of 140° F. (60° C.).

Specimens of labels coated with the resulting adhesive composition differed from those described hereinbefore only in having a period of delayed tack of at least 4 days and in having a tendency to leave a greater amount of the adhesive composition on the polyethylene sheet when peeled therefrom. The peeled label consequently will not adhere as well when applied to a fresh substrate because of the lost portion of the adhesive composition.

Example 9

An adhesive composition was prepared exactly as described in Example 8 except that, instead of 60 parts of the aqueous emulsion of thermoplastic polymer that was used therein, a mixture of 40 parts by weight of the aqueous emulsion of thermoplastic copolymer that was used in Example 8 and 10 parts by weight of the aqueous emulsion of the thermoplastic copolymer of vinylpyrrolidone and ethyl acrylate that was used in Example 1, was used.

Specimens of labels coated with the resulting adhesive composition differed from those coated with the adhesive composition of Example 8 in being more cohesive and having no tendency to leave traces of the adhesive composition on the polyethylene sheet when peeled therefrom. The results of the determination of the relative adhesion to the original polyethylene sheet are included in Table 5 hereinafter.

TABLE 5.—RELATIVE ADHESION (GRAMS PER INCH)

| Aging period | Aging temperature | | |
|---|---|---|---|
| | 0° F. (−18° C.) | 70° F. (21° C.) | 110° F. (43° C.) |
| 10 minutes | 220 | 280 | 295 |
| 1 hour | 240 | 290 | 320 |
| 4 days | 245 | 310 | 335 |

Example 10

An adhesive composition was prepared in accordance with the general method described in Examples 1 and 2 from a mixture of plasticizers consisting of 20 parts by weight of diphenyl phthalate (melting point 69° C.), 60 parts by weight of dicyclohexyl phthalate, and 20 parts by weight of glycerol tribenzoate, and a mixture of aqueous emulsions of thermoplastic polymers consisting of 50 parts by weight of the aqueous emulsion of copolymers of vinylpyrrolidone and ethyl acrylate that was used in Example 1 and 5 parts by weight of an aqueous emulsion containing 40 percent by weight of a copolymer of vinylpyrrolidone and vinyl acetate in the ratio of 60 parts by weight of vinylpyrrolidone to 40 parts by weight of vinyl acetate, which contains no emulsifying agent and which is available under the trade name Polectron 825 from General Aniline and Film Corporation of New York, New York. The mixture of plasticizers and aqueous emulsions were mixed and vigorously agitated at a temperature of 100° F. (38° C.).

Specimens of labels coated with the resulting adhesive composition were substantially identical in relative adhesion characteristics with those of the other examples and had a period of delayed tack of at least 4 days.

Example 11

An adhesive composition was prepared in accordance with the general method described in Examples 1 and 2 from a mixture of plasticizers consisting of 30 parts by weight of sucrose benzoate (melting point 98° C.) and 70 parts by weight of dicyclohexyl phthalate and a mixture of aqueous emulsions consisting of 40 parts by weight of the aqueous emulsion of the thermoplastic copolymer of vinylpyrrolidone and ethyl acrylate that was used in Example 1 and 10 parts by weight of the aqueous emulsion of the thermoplastic copolymer of styrene and butadiene that was used in Example 8.

The relative adhesion of labels coated with the resulting adhesive composition was greater than 500 grams per square inch and the activated film of the adhesive composition remained tacky for at least six weeks.

Inasmuch as the foregoing disclosure comprises preferred embodiments of the invention which were selected only for purposes of illustration, it is to be understood that the invention is not restricted thereto and that modifications and variations may be made therein without departing from the invention, whose scope is restricted only as defined in the appended claims.

I claim:

1. A process of producing a sheet material having a surface area that is covered with an essentially dry, nontacky, thin film of an adhesive composition that becomes tacky when molten and remains tacky for a long period after cooling which consists of vigorously mixing together at a temperature below about 60° C. an aqueous dispersion comprising at least 40 and not more than about 50 percent by weight of discrete particles of a thermoplastic polymer or a mixture of thermoplastic polymers with a molten normally solid plasticizer or a mixture of normally solid plasticizers that is compatible with the thermoplastic polymer in an amount between 3 and 10 parts by weight of the plasticizer to each part by weight of the thermoplastic polymer to form an emulsion of the water-in-oil type in which the discrete particles of the thermoplastic polymer retaining the original water with which they were associated in the aqueous dispersion are dispersed throughout the fluid matrix consisting of the normally solid plasticizer without any substantial interaction or fusion therewith, applying a thin film of the said emulsion while it is still warm and fluid and at a temperature below approximately 60° C. to the surface of the sheet material that is to be coated therewith, and permitting the thus-coated sheet material to dry in the ambient atmosphere.

2. A process as defined in claim 1 in which the thermoplastic polymer is a thermoplastic film-forming water-insensitive polymer of the group consisting of homopolymers of ethylene, vinyl chloride, vinylidene chloride, styrene, methyl and ethyl acrylates and methacrylates, copolymers of ethylene and vinyl acetate, copolymers of styrene and butadiene, copolymers of vinylpyrrolidone and one or more monomers of the group consisting of vinyl acetate, methyl and ethyl acrylates and methacrylates, and styrene, and mixtures or blends of these polymers.

3. A process as defined in claim 1 in which the normally solid plasticizer is one or a mixture of two or more plasticizers of the ester and sulfonamide classes having a melting point of at least 49° C. and below about 100° C.

4. A process as defined in claim 1 in which the thermoplastic polymer is a copolymer of vinylpyrrolidone and ethyl acrylate or a mixture of thermoplastic polymers that includes a copolymer of vinylpyrrolidone and ethyl acrylate.

5. A process as defined in claim 1 in which the thermoplastic polymer is a copolymer of ethylene and vinyl acetate or a mixture of thermoplastic polymers that includes a copolymer of ethylene and vinyl acetate.

6. A process as defined in claim 1 in which the thermoplastic polymer is a thermoplastic acrylate ester polymer or a mixture of thermoplastic polymers that includes a thermoplastic acrylate ester polymer.

7. A process as defined in claim 1 in which the thermoplastic polymer is a copolymer of vinylpyrrolidone and styrene or a mixture of thermoplastic polymers that includes a copolymer of vinylpyrrolidone and styrene.

8. A process as defined in claim 1 in which the thermoplastic polymer is a copolymer of styrene and butadiene or a mixture of thermoplastic polymers that includes a copolymer of styrene and butadiene.

9. A process as defined in claim 1 in which the thermoplastic polymer is a mixture of a copolymer of vinylpyrrolidone and ethyl acrylate and a copolymer of vinylpyrrolidone and vinyl acetate.

10. A process as defined in claim 1 in which the normally solid plasticizer is one or a mixture of two or more plasticizers of the ester and sulfonamide classes having a melting point of at least 49° C. and below about 100° C.

11. A process as defined in claim 1 in which the normally solid plasticizer is tricyclohexyl citrate or a mixture of plasticizers that includes tricyclohexyl citrate.

12. A process as defined in claim 1 in which the normally solid plasticizer is dicyclohexyl phthalate or a mixture of plasticizers that includes dicyclohexyl phthalate.

13. A process as defined in claim 1 in which the normally solid plasticizer is pentaerythritol tetrabenzoate or a mixture of plasticizers that includes pentaerythritol tetrabenzoate.

14. A process as defined in claim 1 in which the normally solid plasticizer is glycerol tribenzoate or a mixture of plasticizers that includes glycerol tribenzoate.

15. A process as defined in claim 1 in which the normally solid plasticizer is trimethylolethane tribenzoate or a mixture of plasticizers that includes trimethylolethane tribenzoate.

16. A process as defined in claim 1 in which the normally solid plasticizer is N-cyclohexyl-p-toluenesulfonamide or a mixture of plasticizers that includes N-cyclohexyl-p-toluenesulfonamide.

17. A process as defined in claim 1 in which the normally solid plasticizer is sucrose benzoate or a mixture of plasticizers that includes sucrose benzoate.

18. A process as defined in claim 1 in which the normally solid plasticizer is present in an amount approximately 5 times the amount in parts by weight of the thermoplastic polymer.

References Cited

UNITED STATES PATENTS

| | | | |
|---|---|---|---|
| 2,613,156 | 10/1952 | McGaffin et al. | 106—170 |
| 2,613,191 | 10/1952 | McGaffin et al. | 260—29.2 |
| 3,165,421 | 1/1965 | Politi et al. | 117—33 |
| 3,208,093 | 9/1965 | Mansen | 15—106 |
| 2,746,885 | 5/1956 | Holt | 117—122 |

OTHER REFERENCES

Becker, "Principles of Emulsion Technology," Reinhold Publishing, 1955, pp. 38–44.

WILLIAM H. SHORT, Primary Examiner.

E. NIELSEN, Assistant Examiner.

U.S. Cl. X.R.

117—155; 260—17.4, 29.6, 30.6, 30.8, 31.6, 31.8